106. COMPOSITIONS, COATING OR PLASTIC.

No. 506,847

UNITED STATES PATENT OFFICE.

AARON H. FREAR, OF WASHINGTON, DISTRICT OF COLUMBIA.

MANUFACTURE OF ARTIFICIAL STONE.

SPECIFICATION forming part of Letters Patent No. 506,847, dated October 17, 1893.

Application filed April 29, 1893. Serial No. 472,409. (No specimens.)

*To all whom it may concern:*

Be it known that I, AARON H. FREAR, of Washington, in the District of Columbia, have invented a new and useful Artificial Stone; and I do hereby declare the following to be a full, clear, and exact description thereof, which will enable others skilled in the art to which my invention appertains to make and use the same.

My invention consists of the following composition, to wit: first, an aqueous solution of litharge; second, a solution of shellac; third, a solution of glue; fourth, a solution of yellow ocher.

In preparing the above composition, I employ a saccharine solution formed by dissolving sugar or molasses in water, in the proportion of about six (6) or eight (8) ounces of sugar or its equivalent of molasses, in about one (1) gallon of water, and then to this quantity I add about one (1) pound of litharge and mix thoroughly; second, three (3) gallons of water, three (3) ounces of saleratus, and one (1) pound of gum shellac, boiled until dissolved; third, one (1) pound of glue (common) in two (2) gallons of water boiled until dissolved; and fourth, one (1) pound of ocher to two (2) gallons of water. I then mix the above together and heat until boiling.

A firm and durable stone is produced by moistening about ten (10) quarts of hydraulic cement, twenty-five (25) quarts of sand or gravel, one (1) quart of gypsum (or plaster of paris) and about three (3) quarts of oxide of iron with my composition, and then firmly pressing the composition into molds of any desired form, either by machinery or hand, with mallets or tamping rod.

For the purpose of imitating marble, I use the oxide of zinc in place of the oxide of iron.

The blocks or other articles thus produced will rapidly harden when removed from the molds, and are ready for use in a few days.

I prefer to compress the materials by percussion rather than by simple or lever pressure.

To produce a more perfect finish I contemplate washing the surface or face of the artificial stone thus manufactured, two or three days after molding the same, with a weak solution of my combination, or of shellac dissolved in alcohol in the proportion of about one (1) pound of shellac to one (1) gallon of alcohol.

To produce a mastic or stucco, I add so much of my combination solution to lime, sand, clay, or any earthy or siliceous material or to mixtures or combinations thereof, as will be reduced by the solution to a pasty consistency, so that it can be worked and applied with a trowel. This compound, when applied in a plastic condition to any suitable surface, will firmly adhere thereto, and, upon hardening, become perfectly waterproof. It may be made to resemble stone so closely as not to be distinguished therefrom. By making the composition still thinner it may be used as a substitute for paint with good effect, and will also form a strong adhesive cement for stone and brick-work.

In applying the stucco or mastic, as above prepared, to buildings, whether of brick or stone, I first wash the surface of the latter with the combination solution preparatory to laying on the composition.

By a proper choice of the sand, or other material, forming the basis of my improved artificial stone, &c., or by the use of pigments in connection therewith, nearly every description of natural stone may be imitated, and any variety of colors or shades obtained at pleasure.

Having thus described my invention, what I claim as new, and desire to secure by Letters Patent, is—

1. A composition of matter for the production of artificial stone consisting of an aqueous saccharine solution of litharge, an alkaline solution of shellac, an aqueous solution of glue, and an aqueous solution of ocher hydraulic cement, sand or gravel, gypsum or plaster of paris and a metallic oxide.

2. The method of preparing artificial stone consisting in, first dissolving sugar or molasses in water, and adding thereto litharge, for the production of an aqueous saccharine solution of litharge, second in producing an alkaline solution of shellac, by boiling the same in water with carbonate of potash until dissolved, third in producing an aqueous solution of glue, and an aqueous solution of ocher and finally mixing the said solutions at a boiling temperature, to which is added hydraulic cement, sand or gravel, gypsum or plaster of paris, and a metallic oxide, then molding and pressing as herein described.

AARON H. FREAR.

Witnesses:
G. M. COPENHAVER,
A. C. RAWLINGS.